(12) United States Patent
Filippov et al.

(10) Patent No.: US 11,714,939 B2
(45) Date of Patent: Aug. 1, 2023

(54) DETERMINING GAS LEAK FLOW RATE IN A WELLBORE ENVIRONMENT

(71) Applicant: Landmark Graphics Corporation, Houston, TX (US)

(72) Inventors: Andrey Filippov, Houston, TX (US); Jianxin Lu, Bellaire, TX (US)

(73) Assignee: Landmark Graphics Corporation, Houston, TX (US)

( * ) Notice: Subject to any disclaimer, the term of this patent is extended or adjusted under 35 U.S.C. 154(b) by 1271 days.

(21) Appl. No.: 16/301,319

(22) PCT Filed: Mar. 8, 2018

(86) PCT No.: PCT/US2018/021615
§ 371 (c)(1),
(2) Date: Nov. 13, 2018

(87) PCT Pub. No.: WO2019/139639
PCT Pub. Date: Jul. 18, 2019

(65) Prior Publication Data
US 2022/0366108 A1    Nov. 17, 2022

Related U.S. Application Data

(60) Provisional application No. 62/615,114, filed on Jan. 9, 2018.

(51) Int. Cl.
*G06F 30/27*     (2020.01)
*E21B 47/117*   (2012.01)
(Continued)

(52) U.S. Cl.
CPC ............ *G06F 30/27* (2020.01); *E21B 47/117* (2020.05); *E21B 2200/20* (2020.05);
(Continued)

(58) Field of Classification Search
CPC .. G06F 30/27; G06F 2111/10; G06F 2113/08; E21B 47/117; E21B 2200/20; E21B 2200/22
See application file for complete search history.

(56) References Cited

U.S. PATENT DOCUMENTS 10,948,471 B1 *  3/2021  MacMullin ............. G01M 3/04
2013/0024138 A1  1/2013  Mills
(Continued)

FOREIGN PATENT DOCUMENTS

CN    106485353       11/2019
WO    2017086981      5/2017

OTHER PUBLICATIONS

Kegang Ling et al., "A New Method for Leak Detection in Gas Pipelines," Society of Petroleum Engineers, SPE 2014-1891568, pp. 97-106 (Year: 2015).*

(Continued)

*Primary Examiner* — Steven W Crabb
(74) *Attorney, Agent, or Firm* — Kilpatrick Townsend & Stockton LLP

(57) ABSTRACT

An estimated gas leak flow rate can be determined using a teaching set of concentration profiles, a regression model implemented by a machine-learning subsystem, and a subset of attributes measured within an environment. The teaching set of concentration profiles can include gas flow rates associated with relevant attributes. The regression model can be transformed into a gas leak flow regression model via the machine-learning subsystem using the teaching set. The subset of attributes measured within the environment can be applied to the gas leak flow regression model to determine other attributes absent from the subset of attributes and an (Continued)

estimated gas flow rate for the environment. A gas leak attenuation action can be performed in response to the estimated gas flow rate.

20 Claims, 4 Drawing Sheets

(51) Int. Cl.
    *G06F 113/08*     (2020.01)
    *G06F 111/10*     (2020.01)

(52) U.S. Cl.
    CPC ....... *E21B 2200/22* (2020.05); *G06F 2111/10* (2020.01); *G06F 2113/08* (2020.01)

(56) References Cited

U.S. PATENT DOCUMENTS

| | | |
|---|---|---|
| 2013/0066568 A1 | 3/2013 | Alonso |
| 2015/0000374 A1 | 1/2015 | Romanak et al. |
| 2016/0298447 A1* | 10/2016 | Mohaghegh ........ E21B 41/0064 |
| 2017/0176182 A1 | 6/2017 | Rella |
| 2017/0205309 A1 | 7/2017 | Franklin |
| 2018/0300639 A1* | 10/2018 | Abbas ...................... G06N 5/04 |

OTHER PUBLICATIONS

NO. Application No. NO20200647, Office Action, dated Jan. 17, 2022, 8 pages.

LU et al., "Dispersion of Relief and Leaked Hazardous Gases on Offshore Facilities", SPE-174102-MS, Jul. 7-8, 2015, 10 pages.

Dobler, Jeremy, et al., "Greenhouse Gas Laser Imaging tomography Experiment (GreenLITE)", EPJ Web of Conferences, 119, 26003 (2016), 4 pages.

International Patent Application No. PCT/US2018/021615, "International Search Report and Written Opinion Received", dated Sep. 12, 2018, 10 pages.

* cited by examiner

DETERMINING GAS LEAK FLOW RATE IN A WELLBORE ENVIRONMENT

CROSS-REFERENCE TO RELATED APPLICATION

This disclosure claims priority to U.S. Provisional Patent Application Ser. No. 62/615,114, titled "Method and Device for Quick Determination of Gas Leak Flow Rate" and filed Jan. 9, 2018, the entirety of which is incorporated herein by reference.

TECHNICAL FIELD

The present disclosure relates generally to systems and methods for use in a well system environment. More specifically, but not by way of limitation, this disclosure relates to quickly determining an estimated gas leak flow rate.

BACKGROUND

Accidental releases of hazardous gases, such as $H_2S$ and $CO_2$, present high risks for health and safety of individuals, as well as damage to surrounding environment. In recent years, due to stricter air pollution and safety standards, it has become more important to evaluate the dispersion of leaked and relieved hazardous gases. These contaminants spread from sources in an industrial facility or a city and can cause environmental and safety issues, as well as health hazards for workers or the city population. Quickly evaluating the amount of released gases based on observed levels of leaked gas concentration can be used to prevent such harms.

DETAILED DESCRIPTION

Figure 1:
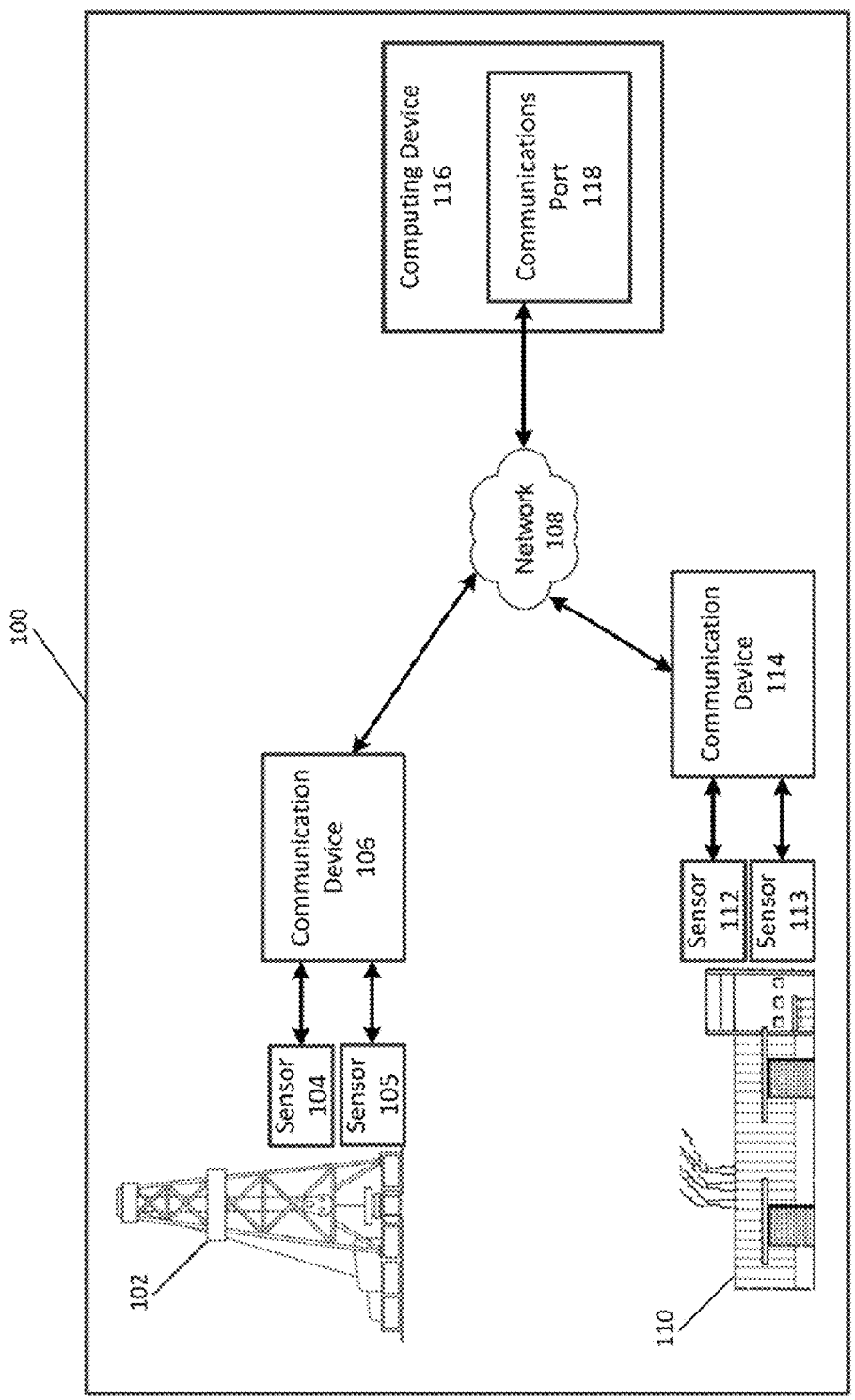
FIG. 1 is a schematic of an example of a gas flow-monitoring environment including multiple monitoring sites according to one aspect of the disclosure.

Certain aspects and features relate to quickly determining a flow rate of a gas leak based on measured concentration profiles, a regression model implemented by a machine-learning subsystem, and a subset of attributes measured within an environment. The estimated flow rate of the gas leak can be used to take an adequate action to address the gas leak in real time. The teaching set of concentration profiles can include gas flow rates associated with relevant attributes. The subset of attributes measured within the environment can be applied to the gas leak flow regression model to determine other attributes absent from the subset of attributes and an estimated gas flow rate to the environment. A gas leak attenuation action can be performed in response to the estimated gas flow rate.

Modern monitoring techniques exist that are based on laser beam absorption by the contaminant's molecules, such as GreenLITE™ Ground Remoted Sensing by Harris Corporation (https://www.harris.com/solution/greenlite-ground-remote-sensing). Such techniques can scan 2D dispersed contaminant concentration profiles at a fixed elevation from the ground in areas from 100 square meters to 30 square kilometers. This technique can monitor gas leaks in a wide range of situations of varying size including small oil rigs and large urban areas. A two-dimensional map representation of $CO_2$ concentration can be obtained and analyzed by a laser-based monitoring system. The two-dimensional map representation can show the measured $CO_2$ concentration profiles in an area.

In some examples, concentration profiles can be based on detailed numerical simulations as an alternative to modern monitoring techniques such as a laser-based monitoring system. The distribution of the concentration profiles can be calculated using existing data or data produced from field tests within an environment of interest. Field tests within an environment can determine information relating to a leak including specified flow rates, leak locations, and weather conditions useable to develop the concentration profiles.

In some examples, the obtained concentration profiles can be compared with the results of detailed numerical simulations of leaked gas dispersion as disclosed in Lu et al., "CFD Analysis and Field Tests of Gas Leakage on Offshore Facilities," SPE-174102-MS, 2015 to cross-validate the results. This detection method, as with other existing methods, can allow for effective measuring of leaked gas levels, but does not allow for the effective measuring of the instantaneous leaked gas flow rate, a primary parameter in evaluating the extent of health risks and pollution dangers to the environment. Some examples of the present disclosure overcome this issue by quickly determining an estimated gas flow rate and providing a corresponding leak attenuation action.

In certain examples, measured concentration profiles can be used as inputs of the regression model. During the teaching stage, the regression model can establish a functional relationship between the leak flow rate and the corresponding concentration profile. Additional numerical simulations and field test measurements derived from any of the aforementioned methods or any similar data collection method can be input to improve the accuracy of the regression model via on-line (i.e., real-time) machine-learning. When used in operational conditions, certain examples may yield quick and accurate estimates of the leaked gas flow rate during accidental releases of gasses. Refining the regression model using additional inputs and data points can allow for more accurate and readily available projections of a gas flow rate within an environment, which can in turn allow for on-line evaluation of health and environmental hazards to facilitate adequate response measures.

The concentration profiles can be utilized to teach a regression model using Gaussian Process Regression (GPR) or deep neural networks (DNN). GPR and DNN are machine-learning algorithms used to model and predict data in non-linear relationships involving a number of variables. A machine-learning subsystem implementing the regression model can transform the regression model into a gas leak flow regression model by applying the concentration profiles within a GPR or DNN. The application of GPR or DNN can allow the gas leak flow regression model to project an estimated gas flow rate for the environment in which the concentration profiles are measured, as well as values for variables relating to the concentration profiles that may not be instantaneously measureable or readily available.

More specifically, in some examples, a method is provided for quickly determining the flow rate of leaked gas based on measured concentration profiles in the area of interest. More effective and accurate mathematics for processing the measured gas leak flow rate data can be based on the GPR or DNN. The GPR can be taught using results of complex computational fluid dynamics (CFD) simulations or detailed leak tests combined with two-dimensional gas concentration profiles provided by a laser-based monitoring system. The laser-based monitoring system alone may measure the concentration profiles required to teach the GPR. When performing the method implementing GPR, the GPR can be applied and taught to create a proxy of the CFD, which allows the system to work in real time by adjusting itself according a number of variables relating to the gas leak environment. This method for real-time determination of leaked gas flow rate can overcome issues with conventional CFD measurements implementing detectors to quantify the concentration field directly, which can be ineffective at determining complex gas leaks instantaneously.

In other examples, after generating and applying the gas leak flow regression model, the resulting estimated gas flow rate and other attributes (e.g., attributes absent from the subset of real world measured attributes originally used as input), may be used as input into the teaching set. Thus, the regression model generation can include the results of and can be further refined by a previous iteration of the originally applied gas flow regression model, creating a subsequent gas leak flow regression model. The subset of measured attributes originally used as input for the gas flow regression model can also be used as input into the teaching set to further refine the regression model.

In some examples, a leak attenuation action can be provided based on the estimated gas flow rate. An estimated gas flow rate, as opposed to simply measuring the concentration of gas within an area, can indicate certain conditions within a particular environment if the estimated gas flow rate is at hazardous or abnormal levels at any given time. For example, if an estimated gas flow rate exceeds a particular threshold value, this may be an indication of an unwanted leak or other malfunction within the environment, and appropriate actions can then be taken to reduce, alter, or eliminate the source of the leak. If, in another example, the estimated gas flow rate is below an anticipated flow rate level, this may be an indication of an obstructed emissions pathway or other malfunction within the environment, and appropriate actions can then be taken to resolve the issue and restore the environment to normal operating conditions. In these and additional scenarios for varying environments, a gas leak attenuation action can be performed in response to a gas flow rate that exceeds a predetermined range of values.

With the application of an advanced GPR or DNN to a regression model based on gas concentration profiles, the gas leak attenuation action can be output substantially contemporaneously to receiving a subset of attributes measured from within an environment, and subsequently performed (i.e., a gas leak flow regression model, created from GPR or DNN and concentration profiles, can receive real-world measurements as input, then output a leak attenuation action in real-time).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 depicts a schematic of a gas flow-monitoring environment 100 including multiple monitoring sites according to one example. In this example, the network 108 can communicatively couple the communication devices 106, 114 with the computing device 116 to relay information gathered by the sensors 104, 105, 112, 113.

The sensors 104, 105 located within or around the environment of a well system 102 and the sensors 112, 113 located within or around the environment of a facility 110 can measure and store any sensory information necessary for or related to the aforementioned examples. The sensors 104, 105, 112, 113 can each be a component of a laser-based monitoring system or the like, or a standalone device that can transmit information to an external gas monitoring system for estimating a gas flow rate and other instantaneously unmeasurable attributes. The sensors 104, 105, 112, 113 can be laser sensors or light absorption sensors that may be placed at a distance from a potential leak source, where the placement of the sensors can define the boundaries of the area monitored for gas leaks. For examples, the each set of sensors 104, 105, 112, 113 may include two or more laser transceivers and a set of reflectors, distributed over a perimeter of the monitored area, such as in a rectangular shape. The sensors 104, 105, 112, 113 can be used to measure attributes, including gas flow rates, gas concentration levels, and environmental conditions, to implement any of the discussed examples.

In this example, the sensors 104, 105 can be communicatively coupled to a communication device 106, and the sensors 112, 113 can be communicatively coupled to a communication device 114. The communication devices 106, 114 can be proximally located to their respective sensors 104, 105, 112, 113, or may be remotely located. Sensors 104, 105, 112, 113 can transmit measured data to their respective communication devices 106, 114.

The communication devices 106, 114 can be communicatively coupled to the communications port 118 of the computing device 116 via network 108. The communication devices 106, 114 can transmit any data measured by and received from the sensors 104, 105, 112, 113 through the network 108 to the computing device 116. The network 108 can be a Wide Area Network or a Local Area Network. The communications port 118 can receive data sent from the communication devices 106, 114. The computing device 116 can similarly transmit requests for sensor information to the communication devices 106, 114, upon which the communication devices 106, 114 can transceive data with respective sensors 104, 105, 112, 113 to fulfill the request by the computing device 116.

Data from the sensors 104, 105, 112, 113 received by the communications port 118 can be relayed to a number of components within the computing device 116 for determining an estimated gas flow rate, unmeasurable attributes, and a gas leak attenuation action.

Figure 2:
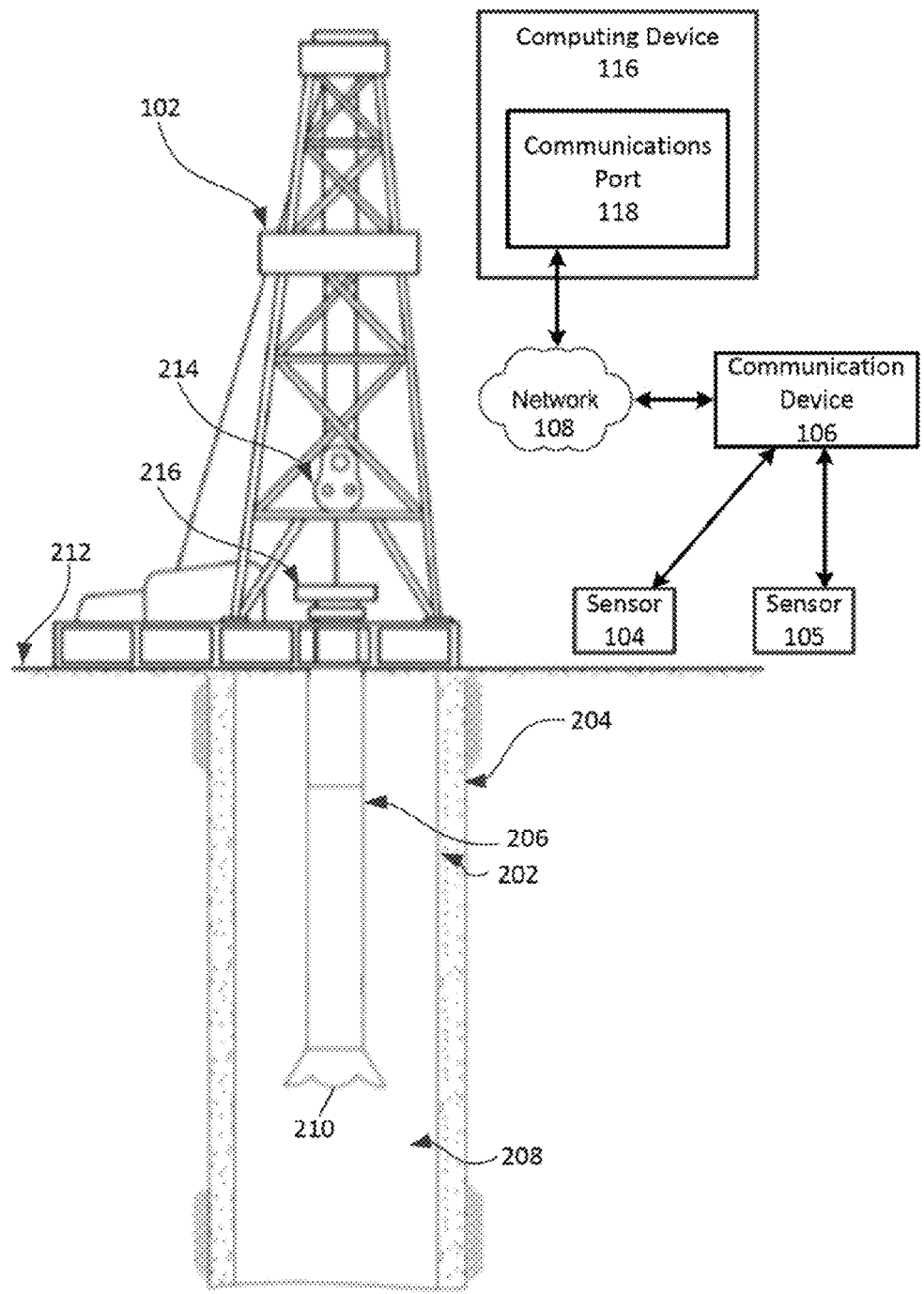
FIG. 2 is schematic of an example of a well system including sensors, a communication device, and a computing device according to one aspect of the disclosure.

FIG. 2 depicts a schematic of the well system 102 of FIG. 1 that includes the sensors 104, 105, the communication device 106, and the computing device 116 according to one example.

The well system 102 can include a wellbore 202 extending through various earth strata. The wellbore 202 extends through a hydrocarbon bearing subterranean formation 204. A wellbore may be created by drilling into the subterranean formation 204 using the wellbore drill assembly 206, which can include a drillstring. The wellbore drill assembly 206 can be driven and can be positioned or otherwise arranged within the wellbore 202 extended into the wellbore 202 from a derrick 216 arranged at the surface 212. The derrick 216 can include the winch 214 used to lower and raise the components within the wellbore drill assembly 206. The wellbore drill assembly 206 may include a drill bit 210 that may be moved axially within a drilled wellbore 202.

The wellbore 202 can include gas 208. The gas 208 can flow in an annulus positioned between the wellbore drill assembly 206 and a wall of the wellbore 202. In some examples, the gas 208 can leak from the wellbore 202 or areas surrounding the wellbore 202 and reach the surface 212 where it can be detected by the sensors 104, 105. This detection can allow the sensors 104, 105 to measure gas-related attributes. The sensors 104, 105 can be used to capture gas-related data about the wellbore environment in a logging while drilling ("LWD") or measurement while drilling ("MWD") configuration.

The sensors 104, 105 can be located within the wellbore 202, proximate to or near the derrick 216 at the surface 212, at a distance from the well system 102, or at any location within the environment appropriate for sensing and measuring gas leakage. The sensors 104, 105 can be devices other than those used within a wellbore environment, and may be any type of sensor capable of measuring gas concentration profiles such as those implemented in the previously discussed laser-based monitoring systems. The sensors 104, 105 can be communicatively coupled to the communication device 106, which can be communicatively coupled to the communications port 118 of the computing device 116 via the network 108. The communications environment can allow the computing device 116 to receive gas-related measurements from the sensors 104, 105 within or around the well system 102 that can be used to determine an estimated gas flow rate.

Figure 3:
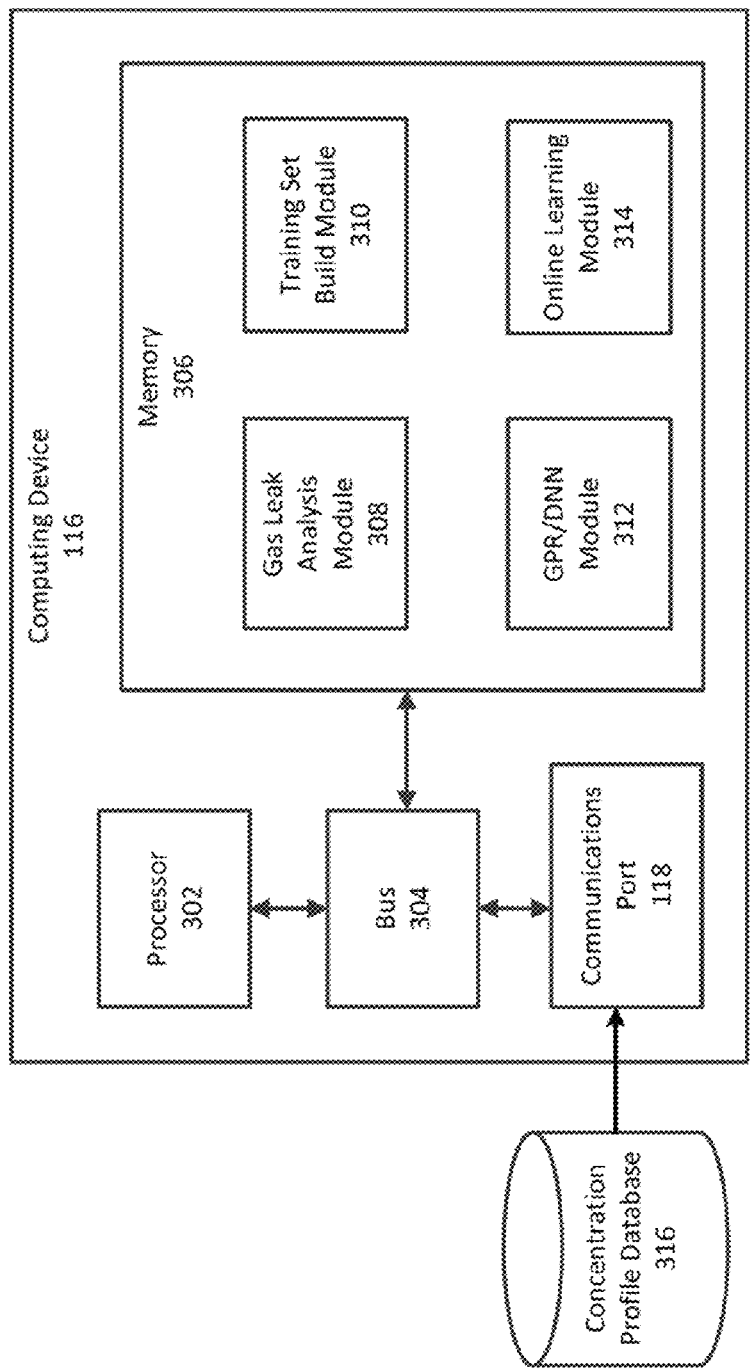
FIG. 3 is a block diagram of an example of a computing device usable for executing program code for quickly determining the flow rate of a gas leak according to one aspect of the disclosure.

FIG. 3 is a block diagram of a computing device 116 usable for executing program code for quickly determining gas leak flow rate according to one example.

The computing device 116 can include a processor 302, a bus 304, a communications port 118, and a memory 306. In some examples, the components shown in FIG. 3 (e.g., the processor 302, the bus 304, the communications port 118, and the memory 306) can be integrated into a single structure. For example, the components can be within a single housing. In other examples, the components shown in FIG. 3 can be distributed (e.g., in separate housings) and in electrical communication with each other.

The processor 302 can execute one or more operations for implementing some examples. The processor 302 can execute instructions stored in the memory 306 to perform the operations. The processor 302 can include one processing device or multiple processing devices. Non-limiting examples of the processor 302 include a Field-Programmable Gate Array ("FPGA"), an application-specific integrated circuit ("ASIC"), a microprocessor, etc.

The processor 302 can be communicatively coupled to the memory 306 via the bus 304. The non-volatile memory 306 may include any type of memory device that retains stored information when powered off. Non-limiting examples of the memory 306 include electrically erasable and programmable read-only memory ("EEPROM"), flash memory, or any other type of non-volatile memory. In some examples, at least some of the memory 306 can include a medium from which the processor 302 can read instructions. A computer-readable medium can include electronic, optical, magnetic, or other storage devices capable of providing the processor 302 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

Concentration profile database 316 can include concentration profiles containing information related to measured or pre-calculated gas concentration levels, which may be represented as two-dimensional maps. Communications port 118 can interface with concentration profile database 316 to transfer concentration profiles to the computing device 116. Concentration profiles received by the communications port 118 can be transmitted to the memory 306 via the bus 304. Similarly, sensory information received by the communications port 118 from external sensing equipment (e.g., sensors 104, 105, 112, 113 as in FIG. 1) can be transmitted to the memory 306 via the bus 304. The memory 306 can store any received concentration profiles and any received sensory information.

The memory 306 can include program code for gas leak analysis module 308, teaching set build module 310, GPR/DNN module 312, or online learning module 314.

Figure 4:
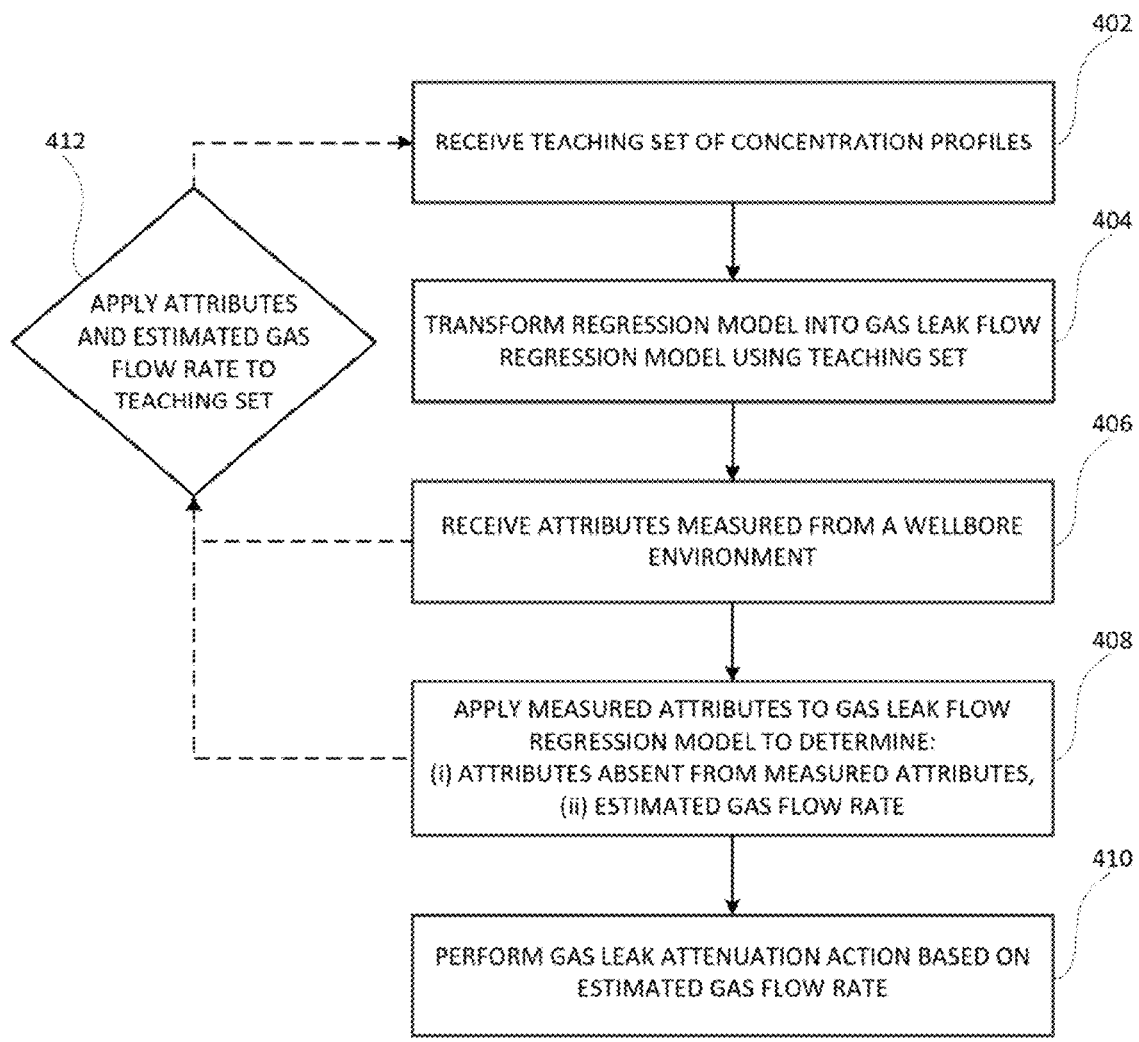
FIG. 4 is a flowchart describing a process for performing real-time estimations of gas leak flow rates according to one aspect of the disclosure.

FIG. 4 is an example of a flowchart describing a process for performing real-time estimations of gas leak flows rates according to one example.

In block 402, the teaching set build module 310 receives a teaching set of concentration profiles. A system, which can be a system or device as described in FIG. 3 or equivalent thereof, can build the teaching set via teaching set build module 310. The teaching set build module can build the teaching set by collecting information relating to the flow conditions, such as wind speed, the released gas concentration profiles, and the corresponding flow rates. This information can be received from field test measurements, via the gas leak analysis module 308, or from detailed numerical simulations via the concentration profile database 316. The gas leak analysis module 308 can calculate an estimated gas flow rate and issue commands relating to a gas leak attenuation action.

In block 404, the regression model, stored in memory 306, is transformed into a gas leak flow regression model using the previously built teaching set. The system can transform the regression model using the teaching set via the teaching set build module 310. The transformation of the regression model into a gas leak flow regression model can be based on application of a GPR or DNN. The GPR or DNN algorithms can be stored in the GPR/DNN module 312. The GPR or DNN algorithms stored within the GPR/DNN module 312 can be continuously updated or altered by the online learning module 314.

In block 406, the communications port 118 receives attributes measured from within a wellbore environment. In addition to a wellbore environment, the attributes can be sourced from any environment including gas sensing devices.

In block 408, the GPR/DNN module 312 applies the measured attributes to the gas leak flow regression model to determine (i) attributes absent from the set of measured attributes and (ii) an estimated gas flow rate. The gas leak regression model can be implemented to assess real world conditions via the GPR/DNN module 312 by inputting a concentration profile with associated attributes. The concentration profile containing real world conditions can be obtained via a laser-based leaked gas scanner. Code for implementing the laser-based leaked gas scanner can be stored within the gas leak analysis module 308. Applying the gas leak regression model to at least one concentration profile representing real world measured attributes can result in an online-projected leak flow rate value (e.g., an estimated gas flow rate determined in real time).

In block 410, gas leak analysis module 308 performs a gas leak attenuation action based on the estimated gas flow rate. The estimated gas flow rate can be assessed by the gas leak analysis module 308. Any number of appropriate leak attenuation actions may then be provided or performed by the computing device 116 to reduce, alter, or eliminate a leak or undesirable condition in response to the estimated gas flow rate. Examples of leak attenuation actions include providing and displaying, by the computing device 116, an alert or command message instructing a user to adjust gas flow rate settings or equipment, or providing, by the computing device 116, a command to a communicatively coupled control system that manages functional operations of the gas leak environment instructing the control system to alter settings or equipment within the environment.

In block 412, the online learning module 314 applies measured and estimated attributes and the estimated gas flow rate to the teaching set. In the case of controlled gas releases or field tests where the corresponding leak flow rate can be measured independently and accurately, the obtained measurements can be used for real-time learning of the regression model and corresponding gas leak flow regression model by adding the obtained measurement data, via the online learning module 314, to the initial teaching set as described in block 402. In addition to the obtained real world measurements, the estimated gas flow rate and projected attributes that are immeasurable in real time (e.g., the results as described in block 408) can also be used as input to further teach the teaching set. This can allow for continuous improvement of the models as stored in teaching set build module 310. In certain scenarios where the dimensions of the monitored gas leak area are small or insignificant enough and weather conditions are stable, the distributions of the leaked gas may be considered stationary in the estimated gas flow rate evaluation calculations, which can simplify the application of this process.

As an example of the process described in FIG. 4, simulations can be performed implementing the abovementioned process. Simulation results similar to those of Lu et al. modeling dispersion of $CO_2$ released on a drillship can be entered in the teaching set of block 402. In this example, the teaching can include 108 two-dimensional profiles (X) of $CO_2$ concentration calculated for eight directions and two speeds of the wind and six release locations, for a prescribed flow rate (Y). The algorithm can be implemented in code, such as in Python version 2.7 and the sklearn. Gaussian_process and sklearn.neural_network libraries. Two models can be considered for the simulation: DNN with four internal layers and a GPR model with an RDF kernel. For the model validation, the concentration profiles corresponding to gas released at arbitrary locations within the domain can be calculated and used as an input (X) to the models. The simulation can produce the following results:

The models can be used for quick on-line (i.e., real-time) projection of the leaked gas flow rates based on provided gas concentration profiles.

The accuracy of taught DNN models (e.g., 80-85%) can be lower than that of the GPR-based models (e.g., 90-95%).

The speed of teaching a GPR model (a couple of minutes on a laptop) can be faster than that for teaching a corresponding DNN model.

In some aspects, systems, devices, and methods for quickly determining an estimated gas flow rate are provided according to one or more of the following examples:

Example 1 is a system comprising: a processing device; a communications port; and a non-transitory computer-readable medium comprising a regression model and a gas leak analysis module that is executable by the processing device to: receive, via the communications port, a teaching set of concentration profiles that include gas flow rates associated with attributes; transform, using the teaching set, the regression model implemented by a machine-learning subsystem into a gas leak flow regression model that is implemented by the machine-learning subsystem; store the gas leak flow regression model in the non-transitory computer-readable medium; receive, via the communications port, a subset of attributes measured from a wellbore environment; and apply the subset of attributes to the gas leak flow regression model to determine other attributes absent from the subset of attributes and an estimated gas flow rate for the wellbore environment.

Example 2 is the system of example 1, wherein the gas leak analysis module is executable by the processing device to output, via the communications port, a command to perform a gas leak attenuation action based on the estimated gas flow rate for the wellbore environment being outside of a pre-set flow rate range, the gas leak attenuation action including an action to reduce a flow rate of a gas leak at the wellbore environment.

Example 3 is the system of example 2, wherein the gas leak analysis module is executable by the processing device to determine the estimated gas flow rate and output the command to perform the gas leak attenuation action substantially contemporaneously to receiving the subset of attributes measured from the wellbore environment.

Example 4 is the system of example 1, wherein the gas leak analysis module is executable by the processing device to include the subset of attributes and the estimated gas flow rate corresponding to the subset of attributes into a subsequent teaching set that is used to transform the gas leak flow regression model into a subsequent gas leak flow regression model implemented by the machine-learning subsystem.

Example 5 is the system of example 1, wherein the machine-learning subsystem is a deep neural network or the regression model is a Gaussian process regression model.

Example 6 is the system of example 1, wherein the concentration profiles include wind speed, released gas concentration profiles, and concentration profile flow rates.

Example 7 is the system of example 1, wherein the teaching set includes measured gas leak flow rates and associated attributes.

Example 8 is a non-transitory computer-readable medium that includes instructions that are executable by a processing device to: receive a teaching set of concentration profiles that include gas flow rates associated with attributes; transform, using the teaching set, a regression model implemented by a machine-learning subsystem into a gas leak flow regression model that is implemented by the machine-learning subsystem; receive a subset of attributes measured from a wellbore environment; and apply the subset of attributes to the gas leak flow regression model to determine other attributes absent from the subset of attributes and an estimated gas flow rate for the wellbore environment.

Example 9 is the non-transitory computer-readable medium of example 8, wherein the instructions are executable by the processing device to output a command to perform a gas leak attenuation action based on the estimated gas flow rate for the wellbore environment being outside of a pre-set flow rate range, the gas leak attenuation action including an action to reduce a flow rate of a gas leak at the wellbore environment.

Example 10 is the non-transitory computer-readable medium of example 9, wherein the instructions are executable by the processing device to determine the estimated gas flow rate and output the command to perform the gas leak attenuation action substantially contemporaneously to receiving the subset of attributes measured from the wellbore environment.

Example 11 is the non-transitory computer-readable medium of example 8, wherein the instructions are executable by the processing device to include the subset of attributes and the estimated gas flow rate corresponding to the subset of attributes into a subsequent teaching set that is used to transform the gas leak flow regression model into a subsequent gas leak flow regression model implemented by the machine-learning subsystem.

Example 12 is the non-transitory computer-readable medium of example 8, wherein the machine-learning subsystem is a deep neural network or the regression model is a Gaussian process regression model.

Example 13 is the non-transitory computer-readable medium of example 8, wherein the concentration profiles include wind speed, released gas concentration profiles, and concentration profile flow rates.

Example 14 is a method comprising: receiving, by a processing device, a teaching set of concentration profiles that include gas flow rates associated with attributes; transforming, by the processing device and using the teaching set, a regression model implemented by a machine-learning subsystem into a gas leak flow regression model that is implemented by the machine-learning subsystem; receiving, by the processing device, a subset of attributes measured from a wellbore environment; and applying, by the processing device, the subset of attributes to the gas leak flow regression model to determine other attributes absent from the subset of attributes and an estimated gas flow rate for the wellbore environment.

Example 15 is the method of example 14, further comprising: outputting, by the processing device, a command to perform a gas leak attenuation action based on the estimated gas flow rate for the wellbore environment being outside of a pre-set flow rate range, the gas leak attenuation action including an action to reduce a flow rate of a gas leak at the wellbore environment.

Example 16 is the method of example 15, wherein the estimated gas flow rate is determined and the command to perform the gas leak attenuation action is outputted substantially contemporaneously to receiving the subset of attributes measured from the wellbore environment.

Example 17 is the method of example 14, further comprising including the subset of attributes and the estimated gas flow rate corresponding to the subset of attributes into a subsequent teaching set that is used to transform the gas leak flow regression model into a subsequent gas leak flow regression model implemented by the machine-learning subsystem.

Example 18 is the method of example 14, wherein the machine-learning subsystem is a deep neural network or the regression model is a Gaussian process regression model.

Example 19 is the method of example 14, wherein the concentration profiles include wind speed, released gas concentration profiles, and concentration profile flow rates.

Example 20 is the method of example 14, wherein the teaching set includes measured gas leak flow rates and associated attributes.

Example 21 is a non-transitory computer-readable medium that includes instructions that are executable by a processing device to: receive a teaching set of concentration profiles that include gas flow rates associated with attributes; transform, using the teaching set, a regression model implemented by a machine-learning subsystem into a gas leak flow regression model that is implemented by the machine-learning subsystem; receive a subset of attributes measured from a wellbore environment; and apply the subset of attributes to the gas leak flow regression model to determine other attributes absent from the subset of attributes and an estimated gas flow rate for the wellbore environment.

Example 22 is the non-transitory computer-readable medium of example 21, wherein the instructions are executable by the processing device to output a command to perform a gas leak attenuation action based on the estimated gas flow rate for the wellbore environment being outside of a pre-set flow rate range, the gas leak attenuation action including an action to reduce a flow rate of a gas leak at the wellbore environment.

Example 23 is the non-transitory computer-readable medium of example 22, wherein the instructions are executable by the processing device to determine the estimated gas flow rate and output the command to perform the gas leak attenuation action substantially contemporaneously to receiving the subset of attributes measured from the wellbore environment.

Example 24 is the non-transitory computer-readable medium of any of example(s) 21 to 23, wherein the instructions are executable by the processing device to include the subset of attributes and the estimated gas flow rate corresponding to the subset of attributes into a subsequent teaching set that is used to transform the gas leak flow regression model into a subsequent gas leak flow regression model implemented by the machine-learning subsystem.

Example 25 is the non-transitory computer-readable medium of any of example(s) 21 to 24, wherein the machine-learning subsystem is a deep neural network or the regression model is a Gaussian process regression model.

Example 26 is the non-transitory computer-readable medium of any of example(s) 21 to 25, wherein the concentration profiles include wind speed, released gas concentration profiles, and concentration profile flow rates.

Example 27 is the non-transitory computer-readable medium of any of example(s) 21 to 26, wherein the teaching set includes measured gas leak flow rates and associated attributes.

Example 28 is the non-transitory computer-readable medium of any of example(s) 21 to 27, wherein the non-transitory computer-readable medium is in a system that comprises: the processing device; and a communications port; the a non-transitory computer-readable medium further comprising a gas leak analysis module that is executable by the processing device to: receive, via the communications port, the teaching set of concentration profiles; store the gas leak flow regression model in the non-transitory computer-readable medium; and receive, via the communications port, the subset of attributes measured from a wellbore environment.

Example 29 is a method comprising: receiving, by a processing device, a teaching set of concentration profiles that include gas flow rates associated with attributes; transforming, by the processing device and using the teaching set, a regression model implemented by a machine-learning subsystem into a gas leak flow regression model that is implemented by the machine-learning subsystem; receiving, by the processing device, a subset of attributes measured from a wellbore environment; and applying, by the processing device, the subset of attributes to the gas leak flow regression model to determine other attributes absent from the subset of attributes and an estimated gas flow rate for the wellbore environment.

Example 30 is the method of example 29, further comprising: outputting, by the processing device, a command to perform a gas leak attenuation action based on the estimated gas flow rate for the wellbore environment being outside of a pre-set flow rate range, the gas leak attenuation action including an action to reduce a flow rate of a gas leak at the wellbore environment.

Example 31 is the method of example 30, wherein the estimated gas flow rate is determined and the command to perform the gas leak attenuation action is outputted substantially contemporaneously to receiving the subset of attributes measured from the wellbore environment.

Example 32 is the method of any of example(s) 29 to 31, further comprising including the subset of attributes and the estimated gas flow rate corresponding to the subset of attributes into a subsequent teaching set that is used to transform the gas leak flow regression model into a subsequent gas leak flow regression model implemented by the machine-learning subsystem.

Example 33 is the method of any of example(s) 29 to 32, wherein the machine-learning subsystem is a deep neural network or the regression model is a Gaussian process regression model.

Example 34 is the method of any of example(s) 29 to 33, wherein the concentration profiles include wind speed, released gas concentration profiles, and concentration profile flow rates.

Example 35 is the method of any of example(s) 29 to 34, wherein the teaching set includes measured gas leak flow rates and associated attributes.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device;
a communications port; and
a non-transitory computer-readable medium comprising a regression model and a gas leak analysis module that is executable by the processing device to:
receive, via the communications port, a teaching set of concentration profiles that include gas flow rates associated with attributes;
transform, using the teaching set, the regression model implemented by a machine-learning subsystem into a gas leak flow regression model that is implemented by the machine-learning subsystem;
store the gas leak flow regression model in the non-transitory computer-readable medium;
receive, via the communications port, a subset of attributes measured from a wellbore environment; and
apply the subset of attributes to the gas leak flow regression model to determine other attributes absent from the subset of attributes and an estimated gas flow rate for the wellbore environment.

2. The system of claim 1, wherein the gas leak analysis module is executable by the processing device to output, via the communications port, a command to perform a gas leak attenuation action based on the estimated gas flow rate for the wellbore environment being outside of a pre-set flow rate range, the gas leak attenuation action including an action to reduce a flow rate of a gas leak at the wellbore environment.

3. The system of claim 2, wherein the gas leak analysis module is executable by the processing device to determine the estimated gas flow rate and output the command to perform the gas leak attenuation action substantially contemporaneously to receiving the subset of attributes measured from the wellbore environment.

4. The system of claim 1, wherein the gas leak analysis module is executable by the processing device to include the subset of attributes and the estimated gas flow rate corresponding to the subset of attributes into a subsequent teaching set that is used to transform the gas leak flow regression model into a subsequent gas leak flow regression model implemented by the machine-learning subsystem.

5. The system of claim 1, wherein the machine-learning subsystem is a deep neural network or the regression model is a Gaussian process regression model.

6. The system of claim 1, wherein the concentration profiles include wind speed, released gas concentration profiles, and concentration profile flow rates.

7. The system of claim 1, wherein the teaching set includes measured gas leak flow rates and associated attributes.

8. A non-transitory computer-readable medium that includes instructions that are executable by a processing device to:
receive a teaching set of concentration profiles that include gas flow rates associated with attributes;
transform, using the teaching set, a regression model implemented by a machine-learning subsystem into a gas leak flow regression model that is implemented by the machine-learning subsystem;
receive a subset of attributes measured from a wellbore environment; and
apply the subset of attributes to the gas leak flow regression model to determine other attributes absent from the subset of attributes and an estimated gas flow rate for the wellbore environment.

9. The non-transitory computer-readable medium of claim 8, wherein the instructions are executable by the processing device to output a command to perform a gas leak attenuation action based on the estimated gas flow rate for the wellbore environment being outside of a pre-set flow rate range, the gas leak attenuation action including an action to reduce a flow rate of a gas leak at the wellbore environment.

10. The non-transitory computer-readable medium of claim 9, wherein the instructions are executable by the processing device to determine the estimated gas flow rate and output the command to perform the gas leak attenuation action substantially contemporaneously to receiving the subset of attributes measured from the wellbore environment.

11. The non-transitory computer-readable medium of claim 8, wherein the instructions are executable by the processing device to include the subset of attributes and the estimated gas flow rate corresponding to the subset of attributes into a subsequent teaching set that is used to transform the gas leak flow regression model into a subsequent gas leak flow regression model implemented by the machine-learning subsystem.

12. The non-transitory computer-readable medium of claim 8, wherein the machine-learning subsystem is a deep neural network or the regression model is a Gaussian process regression model.

13. The non-transitory computer-readable medium of claim 8, wherein the concentration profiles include wind speed, released gas concentration profiles, and concentration profile flow rates.

14. A method comprising:
  receiving, by a processing device, a teaching set of concentration profiles that include gas flow rates associated with attributes;
  transforming, by the processing device and using the teaching set, a regression model implemented by a machine-learning subsystem into a gas leak flow regression model that is implemented by the machine-learning subsystem;
  receiving, by the processing device, a subset of attributes measured from a wellbore environment; and
  applying, by the processing device, the subset of attributes to the gas leak flow regression model to determine other attributes absent from the subset of attributes and an estimated gas flow rate for the wellbore environment.

15. The method of claim 14, further comprising:
  outputting, by the processing device, a command to perform a gas leak attenuation action based on the estimated gas flow rate for the wellbore environment being outside of a pre-set flow rate range, the gas leak attenuation action including an action to reduce a flow rate of a gas leak at the wellbore environment.

16. The method of claim 15, wherein the estimated gas flow rate is determined and the command to perform the gas leak attenuation action is outputted substantially contemporaneously to receiving the subset of attributes measured from the wellbore environment.

17. The method of claim 14, further comprising including the subset of attributes and the estimated gas flow rate corresponding to the subset of attributes into a subsequent teaching set that is used to transform the gas leak flow regression model into a subsequent gas leak flow regression model implemented by the machine-learning subsystem.

18. The method of claim 14, wherein the machine-learning subsystem is a deep neural network or the regression model is a Gaussian process regression model.

19. The method of claim 14, wherein the concentration profiles include wind speed, released gas concentration profiles, and concentration profile flow rates.

20. The method of claim 14, wherein the teaching set includes measured gas leak flow rates and associated attributes.

* * * * *